United States Patent
Ozawa

[11] Patent Number: 5,851,391
[45] Date of Patent: Dec. 22, 1998

[54] SLUDGE DEWATERING TREATMENT APPARATUS

[75] Inventor: Keiichi Ozawa, Kawasaki, Japan

[73] Assignee: Cosmic Round Company, Kawasaki, Japan

[21] Appl. No.: 8,864

[22] Filed: Jan. 20, 1998

[30] Foreign Application Priority Data

Jan. 20, 1997 [JP] Japan .................................. 9-022125

[51] Int. Cl.⁶ .......................... B01D 33/29; B01D 33/54; B30B 9/26
[52] U.S. Cl. .......................... 210/350; 210/351; 210/385; 210/388; 210/405; 100/116
[58] Field of Search ................... 210/350, 351, 210/385, 388, 405; 100/116

[56] References Cited

U.S. PATENT DOCUMENTS 5,174,907  12/1992  Chowh .
5,439,588   8/1995  Chowh .

FOREIGN PATENT DOCUMENTS

3-56106    3/1991  Japan .
6-277896  10/1994  Japan .
1653806    6/1991  U.S.S.R. .

*Primary Examiner*—Thomas M. Lithgow
*Attorney, Agent, or Firm*—Oblon, Spivak, McClelland, Maier & Neustadt, P.C.

[57] ABSTRACT

The sludge dewatering treatment apparatus of the present invention is provided with a cylinder that has a large number of pipe members arranged in the axial direction and secured around its inner surface, that is divided axially into two halves so as to allow opening and closing, and that is vertically installed in a frame. A rotating pipe shaft that is capable of both rotating and moving up and down is provided in an axial direction at the center of this cylinder. The rotating pipe shaft can receive sludge at an opening in its upper end from the outlet of a sludge holding hopper installed on the frame, and discharges the received sludge into a filter from sludge outflow ports. A cylindrical filter is provided that surrounds the rotating pipe shaft, the upper end of the filter being attached to the rotating pipe shaft and the lower end of the filter being attached to an opening in the base plate of the frame. The cylindrical filter takes in the sludge from the outflow ports. The diameter of the cylindrical filter is greater than the diameter of a circle inscribed within the pipe members secured in the cylinder. The rotation of the rotating pipe shaft therefore applies pressure against sludge inside the cylindrical filter, whereby the sludge is separated into water and a dewatered cake material.

3 Claims, 7 Drawing Sheets

FIG.7  FIG.8 ize: 0; border-width: 0"># SLUDGE DEWATERING TREATMENT APPARATUS

BACKGROUND OF THE INVENTION

The present invention relates to an apparatus that dewaters sludge (bentonite waste fluid, bottom sediment), which is produced chiefly by cast-in-place pile methods using in particular earth drills in construction earthwork, and separates the product as water and a dewatered cake material (solidified sludge); and further relates to a sludge dewatering treatment apparatus that can also be applied to water removal and separation processes for foodstuffs such as juice, or to processes for removing water from the viscera of fish or marine products and converting the cake that remains after water removal into livestock or poultry feed.

DESCRIPTION OF THE RELATED ART

The inventors of this device previously applied for and obtained grant of a patent for a sludge treatment apparatus (Japanese Patent No. 1921035, Japanese Patent Publication No. 42925/94, Japanese Patent Laid-open No. 56106/91), which is a form of the present apparatus, wherein each of a plurality of cylinders is fixed in an upright position with the open lower end of each cylinder confronting and inserted into an opening in a fixed plate provided on the lower portion of a frame. A cylindrical filter open at both top and bottom is inserted into each cylinder concentrically with clearance space. The upper end portions of these cylindrical filters are coupled rotatably to a branched sludge discharge tube, and moreover, surround the side surface of and are secured to the outer circumference of the lower end of a pipe shaft having sludge outlets through its lower end. The lower end portion of each of cylindrical filters confronts the opening of a flange that is provided in the lower end opening of the cylinders and is secured to this flange. A rod shaft that rotates as a unit with the pipe shaft and that conveys a twisting motion to the cylindrical filter is coupled to the lower shaft end of said pipe shaft and the lower end of the rod shaft is supported by a rod shaft support, which is provided inside of a cover for opening and closing the lower-end opening of the cylindrical filter, the rod shaft either being inserted into rod shaft support or detached from rod shaft support depending on open and closed state of the cover. A pipe shaft rotation mechanism is provided for conveying a twisting motion to the cylindrical filters by rotating the pipe shaft, and a means is also provided for discharging water from each cylinder. Thus, this sludge treatment apparatus gives a twisting action to sludge introduced into the cylindrical filter from the branched sludge discharge tube by way of the sludge inflow opening in the pipe shaft, thereby removing water, and then both discharges this water to the outside and discharges the solidified sludge inside cylindrical filter to the outside.

In the sludge treatment apparatus of the above-described patent, however, the cylinders into which the cylindrical filters are installed serve no other purpose than to prevent water that is extracted by the cylindrical filters from being dispersed to the outside. As a result, there are the problems that dewatering of sludge is inefficient because dewatering is carried out only by the twisting action of the cylindrical filters, and that drainage of the extracted water from the cylinders is poor because the water must flow down and out while water is dispersed inside the cylinders.

SUMMARY OF THE INVENTION

The object of the present invention is therefore to provide a sludge dewatering treatment apparatus having superior operability that extracts water efficiently by the twisting motion of a cylindrical filter, that allows superior drainage of the extracted water, and moreover, that facilitates extraction of dewatered cake material.

In view of the above-described problems, and as a result of diligent research to solve these problems, the present invention was conceived and brought to completion, whereby:

a cylinder is divided in the axial direction into a fixed side and a movable side, these two sides being joined so as to form a cylindrical structure that can be opened and closed;

a large number of round pipe members are aligned and secured in an axial direction around the inner circumferential surface of the cylinder;

wherein, by making the outer diameter of a cylindrical filter greater than the diameter of a circle inscribed within these round pipe members, pressure is applied against sludge inside the cylindrical filter during the twisting motion of the cylindrical filter by way of the outer circumferential surfaces of the aligned round pipe members, which form a substantially wave-shaped surface as seen in a section taken at a right angle to the axis;

whereby water is efficiently extracted, and, because extracted water is guided by each round pipe member and flows down without being dispersed, drainage is excellent, and moreover, the dewatered cake can be easily removed from the cylindrical filter upon opening the cylinder and extracting the dewatered cake both because the cylinder can be closed or opened into two parts and because the outer diameter of the cylindrical filter is greater than the diameter of a circle inscribed within the round pipe members.

To achieve the above-described objects, the present invention is provided with:

a hopper for holding sludge that is installed on a fixed plate on support columns provided vertically on the top plate of a frame;

a cylinder that is open at top and bottom, that is vertically installed on the frame, and that is secured at an opening in the top plate of said frame;

a rotating pipe shaft having an upper end opening into which an outlet of the sludge holding hopper is inserted with clearance so as to realize continuous flow-through passage, that is arranged vertically and concentrically inside the cylinder, and further, that has sludge outflow ports;

a cylindrical filter that surrounds the rotating pipe shaft, that is attached at its upper portion to the rotating pipe shaft above the sludge outflow ports, and that is secured at its lower portion to the rim of an opening in the base plate of the frame;

a rotating pipe shaft rotation mechanism that is installed on a movable plate that is movable up and down along the support columns, and that serves to rotate said rotating pipe shaft and convey a twisting motion to said cylindrical filter;

an opening and closing cover construction that opens the base opening of the frame to allow discharge to the outside of dewatered cake material inside the cylindrical filter;

a water drainage construction installed on the frame that drains water that is inside the cylinder that has been extracted by the cylindrical filter; wherein:

the cylinder is a cylindrical construction that is divided in the axial direction into two parts, a fixed side and a movable side, to form a coupled cylindrical construction that can be opened and closed;

round pipe members are secured in a row in an axial direction around the inner surface of the cylinder that contact and press the cylindrical filter during the twisting motion of the cylindrical filter so as to improve the extraction of water, and that moreover guide the extracted water so as to improve drainage;

whereby:

a twisting motion is applied to sludge that has been introduced into the cylindrical filter from the sludge holding hopper by way of the sludge outflow ports of the rotating pipe shaft;

water is extracted to the cylinder and drained to the outside; and dewatered cake material inside the cylindrical filter is ejected to the outside by way of the opening and closing cover construction.

The sludge is thus efficiently dewatered and separated by the twisting action of the cylindrical filter and the contact and pressure against each round pipe member inside the cylinder. As for the method of removing the dewatered cake to the outside when dewatered cake has formed, the cylinder can be opened and closed, and the dewatered cake easily separates from the cylindrical filter upon opening the movable side of the cylinder because the diameter of the cylindrical filter is set to somewhat greater than the diameter of a circle inscribed within the round pipe members. The dewatered cake is further broken up by both a dewatered cake pad on the opening and closing cover plate and claw members on the lower end of the rotating pipe shaft, whereby the cake readily falls and is discharged. In addition, the water extracted by the twisting action of the cylindrical filter follows each round pipe member and flows down without being dispersed inside the cylinder to collect in a tank and is thus easily drained.

The above and other objects, features, and advantages of the present invention will become apparent from the following description based on the accompanying drawings which illustrate an example of a preferred embodiment of the present invention.

DETAILED DESCRIPTION OF THE PREFERRED EMBODIMENTS

The form and operation of an embodiment of the present invention will next be described with reference to FIGS. 1–8. As shown in these figures, the apparatus of the present invention is provided with a frame, a sludge holding hopper, a cylinder, a rotating pipe shaft, a cylindrical filter, a rotating pipe shaft rotation mechanism, an opening and closing cover construction, and water drainage construction.

Figure 4:
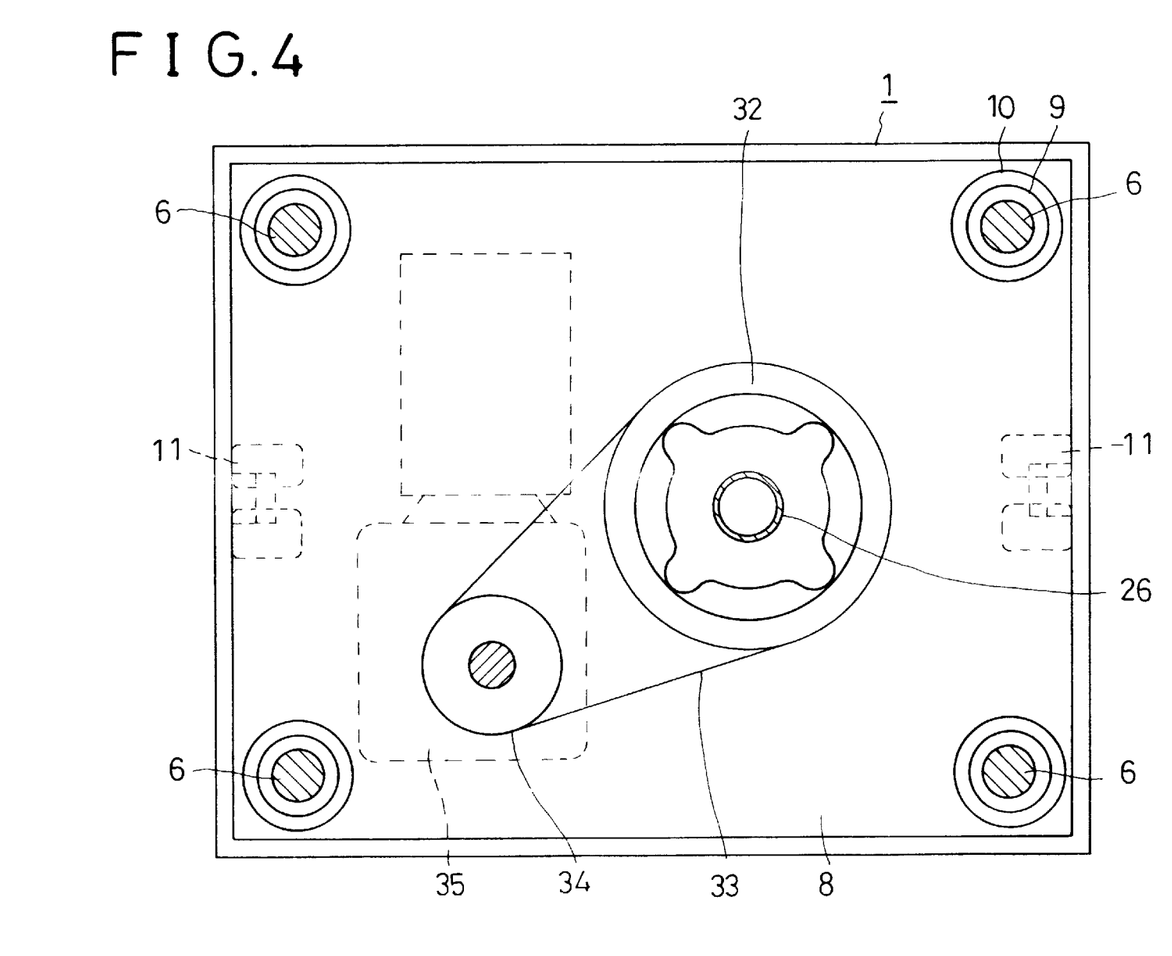
FIG. 4 is a schematic plan view illustrating the rotation mechanism of the rotating pipe shaft.
Figure 8:
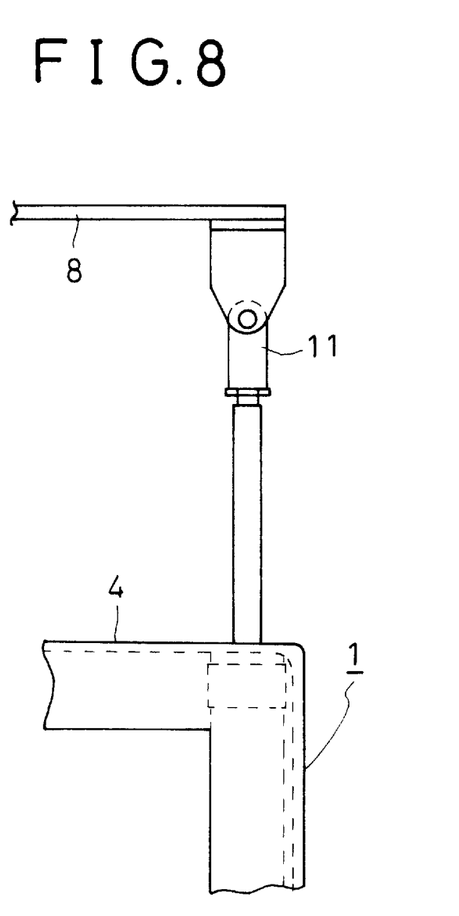
FIG. 8 is a partial view illustrating one example of the means for applying vertical movement in the rotating pipe shaft rotation mechanism.

Vertical frame 1 includes frame members 2 and 3, top plate 4 and base plate 5; support columns 6 are secured in upright positions at the four corners of top plate 4; fixed plate 7 is horizontally secured at the upper end of these four support columns 6; and movable plate 8 is attached to these four support columns 6 below this fixed plate 7 by bushings 9 and nuts 10 so as to allow movement up and down along support columns 6, and, as shown in FIGS. 4 and 8, is supported horizontally by means of air cylinders 11 installed vertically at two positions on frame top plate 4. Sludge holding hopper 13 is attached to fixed plate 7 by means of support 12. A butterfly valve 16 is provided in the lower outlet 14 area of sludge holding hopper 13 by way of a flange 15, and by means of this butterfly valve 16, sludge inside hopper 13 is fed at an automatically fixed amount into a rotating pipe shaft that is described hereinbelow.

Figure 1:
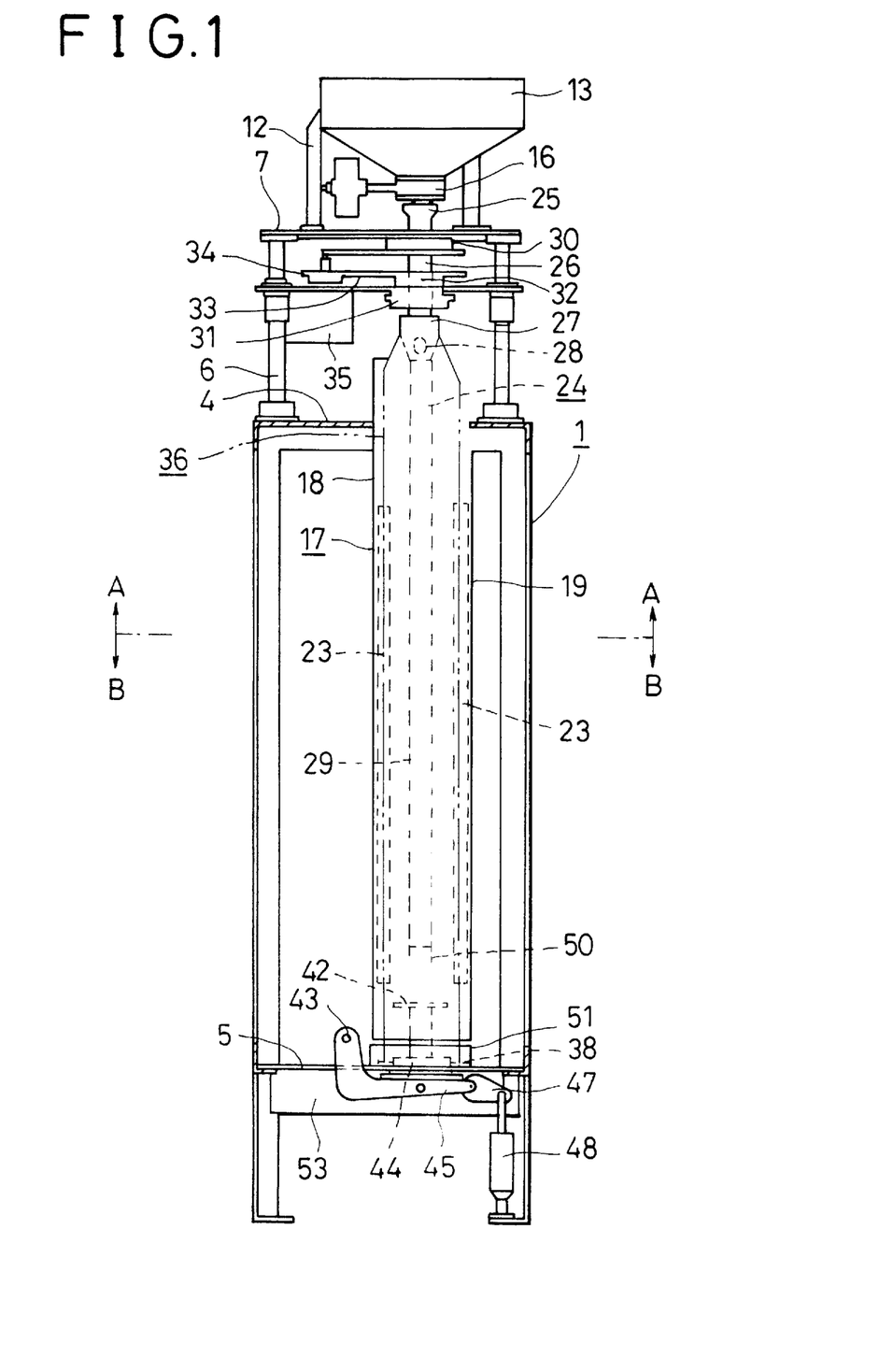
FIG. 1 is a vertical section providing a schematic representation of one embodiment of the sludge dewatering treatment apparatus according to the present invention.
Figure 2:
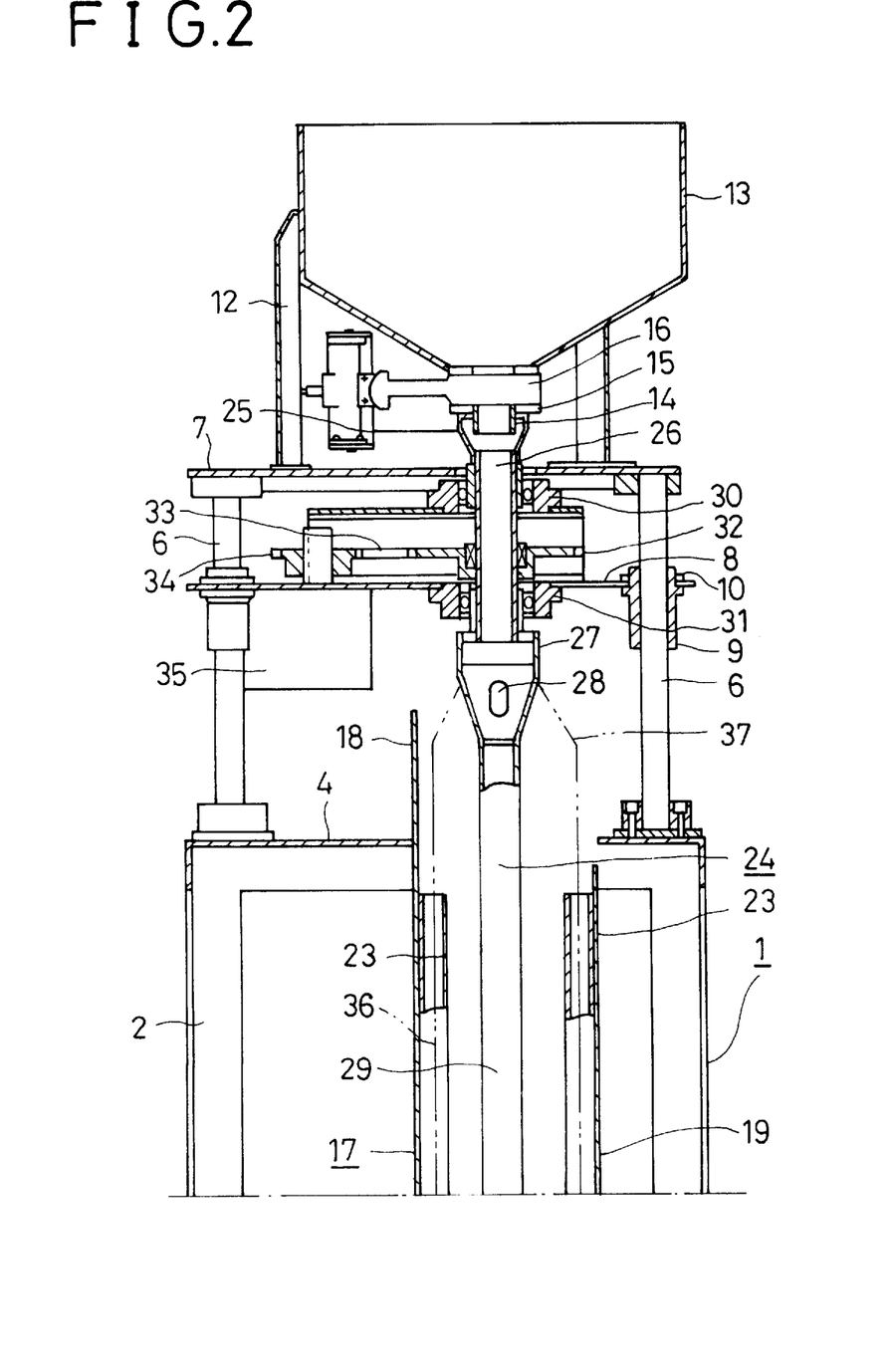
FIG. 2 is a vertical section providing an enlarged schematic view of the portion above the A—A line of FIG. 1.
Figure 6:
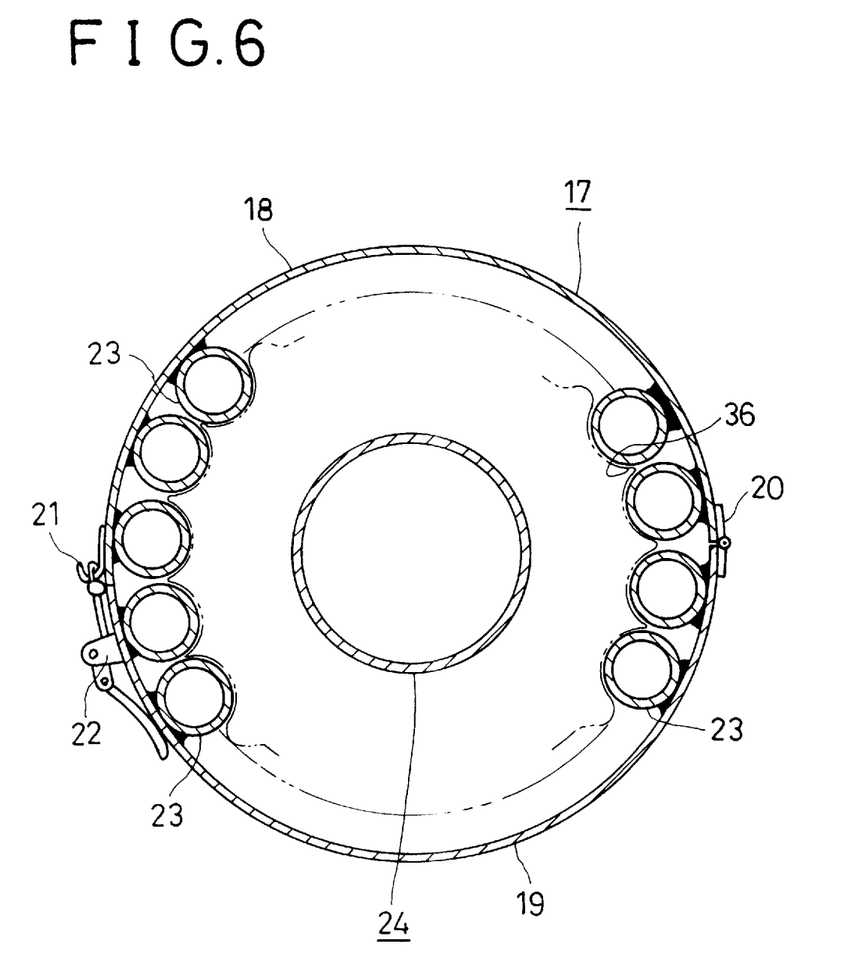
FIG. 6 is a horizontal section showing an enlarged schematic view of the cylinder.

Cylinder 17, which is open at top and bottom, is welded in an upright position to an opening in frame top plate 4. As shown in FIG. 6, cylinder 17 is split axially into fixed side 18 and movable side 19, movable side 19 being joined to fixed side 18 by means of long metal hinge 20 so as to allow opening and closing, and when in a closed state, this closed state is maintained by a plurality of hooks 21 welded to fixed side 18 and adjustable fasteners 22 welded to movable side 19. As shown in FIGS. 1 and 2, cylinder 17 is formed so as not to hinder opening and closing by cutting movable side 19 one step lower than fixed side 18 (slightly lower than frame top plate 4). In addition, a large number of round pipe members 23 each separated [from adjacent round pipe members 23] by a narrow gap are welded in the axial direction around the inner circumference of fixed side 18 and movable side 19 of cylinder 17. The upper ends of these round pipe members 23 are aligned at a position that is approximately the same height as the upper end of movable side 19, and the lower ends are aligned at a position that does not interfere with pad 42, which is provided for falling dewatered cake and is installed on the base cover in the opening and closing cover construction to be described hereinbelow.

Round pipe members 23, which are aligned and secured in the axial direction around the inner circumference of cylinder 17 form an approximate wave pattern as viewed in a section perpendicular to the axis, are an indispensable component both because they apply pressure to sludge inside the cylindrical filter during the twisting motion of a cylindrical filter to be described hereinbelow that has an outer diameter somewhat greater than a circle inscribed within these round pipe members 23, thereby enabling efficient dewatering, and because each round pipe member 23 guides extracted water as it flows down such that water is not dispersed inside cylinder 17, thereby enabling easy drainage. As for the reason for forming cylinder 17 so as to allow opening and closing, since the diameter of the cylindrical filter is larger than the diameter of a circle inscribed within round pipe members 23, the action of opening movable side 19 of cylinder 17 at the time of discharging dewatered cake causes the dewatered cake to readily separate from the cylindrical filter, thereby facilitating easy removal of dewatered sludge. Furthermore, although description in this embodiment indicates that the opening and closing of movable side 19 in cylinder 17 is a manual operation, the invention is not limited to this form, and opening and closing of movable side 19 may also be carried out automatically, for example, by adding an air cylinder.

Figure 3:
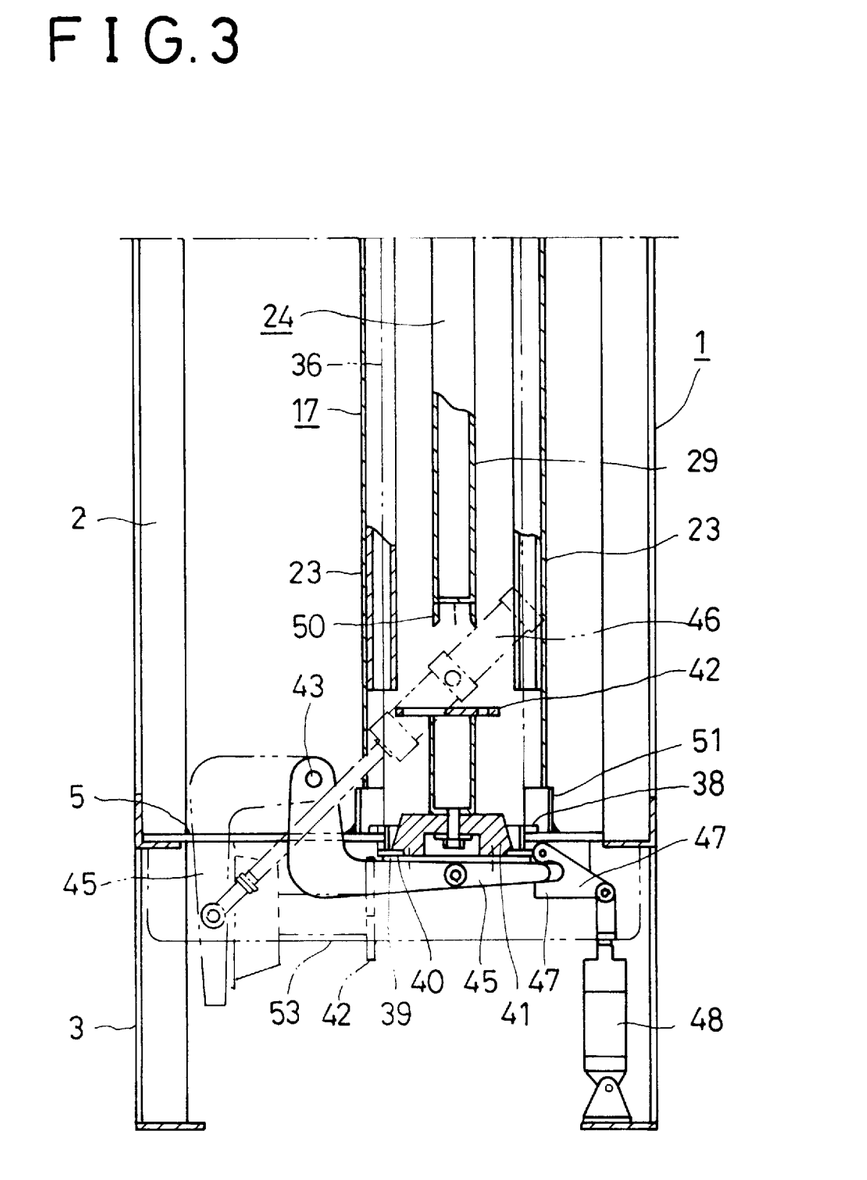
FIG. 3 is a vertical section providing an enlarged schematic view of the portion below the B—B line of FIG. 1.

As shown in FIGS. 1 to 3, rotating pipe shaft 24 is vertically installed inside and concentric with cylinder 17. This rotating pipe shaft 24 is provided to convey a twisting motion to cylindrical filter to be described hereinbelow; and this rotating pipe shaft 24 is further formed from: hopper 25 of approximately funnel shape with an open upper surface; short pipe shaft 26 having its upper end opening welded to the lower-end opening of hopper 25 so as to form a concentric link that allows continuous flow-through passage; chute shaft 27 of approximately funnel shape having an upper end opening welded to the lower-end opening of short pipe shaft 26 to form a concentric coupling that allows continuous flow-through passage, having a closed lower end, and moreover, having a plurality of sludge outflow ports 28 opened in its outer circumferential surface; and long pipe shaft 29 having a closed upper end welded and concentrically joined to the closed lower end of chute shaft 27. This rotating pipe shaft 24 has the wide upper-end opening of hopper 25 disposed opposite the lower-end outlet of sludge holding hopper 13 so as to form a continuous flow-through passage, is enclosed within cylinder 17 from the area of sludge outflow ports 28 of chute shaft 27 to as far as the lower end of pipe shaft 29, and is installed vertically so as to be rotatable by a rotation mechanism.

To explain in further detail, the rotation mechanism of rotating pipe shaft 24 is made up of: bearing 31 at the lower-end portion of short pipe shaft 26 that is provided on the bottom surface of movable plate 8; bearing 30 at the upper-end portion of short pipe shaft 26 that is provided on movable plate 8 and below fixed plate 7; sprocket wheel 32 secured onto short pipe shaft 26 slightly above bearing 31; sprocket wheel 34 installed on movable plate 8 that moreover is rotatably linked with sprocket wheel 32 by means of drive chain 33; and drive motor 35 provided on the lower side of movable plate 8. The turning force resulting from the rotation of drive motor 35 is transmitted to sprocket wheel 32 by way of sprocket wheel 34 and drive chain 33, thereby causing rotating pipe shaft 24 to rotate forward or in reverse with upper and lower bearings 30 and 31 as supports.

As roughly indicated by the chain line dash and double-dot line in FIGS. 1, 2, and 3, cylindrical filter 36 is provided inside cylinder 17. Cylindrical filter 36 is provided for the purpose of using a twisting motion on sludge introduced inside the filter to extract water, and may employ, for example, a tough but flexible fabric. This cylindrical filter 36 has open upper and lower ends, the upper end narrowing by means of shoulder portion 37, and the diameter of cylindrical filter 36 being somewhat greater than the diameter of a circle inscribed inside round pipe members 23. The lower end portion of cylindrical filter 36 is held between frame base plate 5 and flange 38 that is bolted to the rim of the lower-end opening of cylinder 17, while at the upper end portion [of cylindrical filter 36], shoulder portion 37 surrounds the sludge outflow ports 28 of chute shaft 27 and is attached to the outer circumference of chute shaft 27 by, for example, a band (not shown in the figures).

The opening and closing cover construction that opens the opening of frame base plate 5 for ejecting dewatered cake inside cylindrical filter 36 to the outside is made up of: cover plate 39 that opens and closes the opening; dewatered cake pad 42 that is approximately T-shaped in form and provided with a substantially round plate having irregularly shaped holes on its top, that is installed upright at the central position on top of a truncated-cone base 41 provided upright on the inside of cover plate 39 with an interposed rubber sheet member 40; arm 45 approximately L-shaped in form that is attached to cover plate 39 and that governs the opening and closing of cover plate 39 by rotating downward at a notched portion 44 in base plate 5 with support shaft 43 as the point of support; arm-drive cylinder 46 provided on frame 1; hook member 47 for locking arm 45 and maintaining the closed state when the cover is closed; and hook member drive cylinder 48 provided on frame 1. In addition, a pressure sensor not shown in the figure is provided on truncated-cone base 41, pressure applied on the sludge being detected by means of this pressure sensor so that the rotation of drive motor 35 can be automatically halted to stop the rotation of rotating pipe shaft 24 when a set pressure is reached, whereby sludge can always be separated into water and dewatered cake of uniform hardness.

Figure 7:
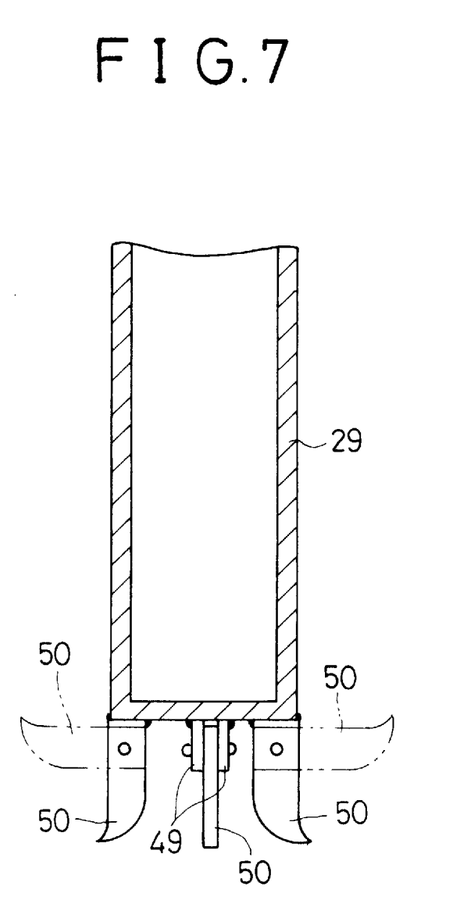
FIG. 7 is a view illustrating the action of the claw member for breaking away dewatered cake on the rotating pipe shaft.

Dislodging and discharging dewatered cake from cylindrical filter 36 to the outside is facilitated by dewatered cake pad 42 on cover plate 39, but to further facilitate the dislodging and discharging process, claw members 50 are supported by shafts so as to be freely rotatable between pairs of attachment plates 49 welded at four locations on the lower closed end of long pipe shaft 29 on rotating pipe shaft 24, each of these claw members 50 hanging vertically when rotating pipe shaft 24 rises but rotating outward to assume a horizontal position as shown by dotted lines in the figure when rotating pipe shaft 24 descends, the claw members 50 thereby breaking apart dewatered cake and facilitating the dislodging of dewatered cake.

Figure 5:
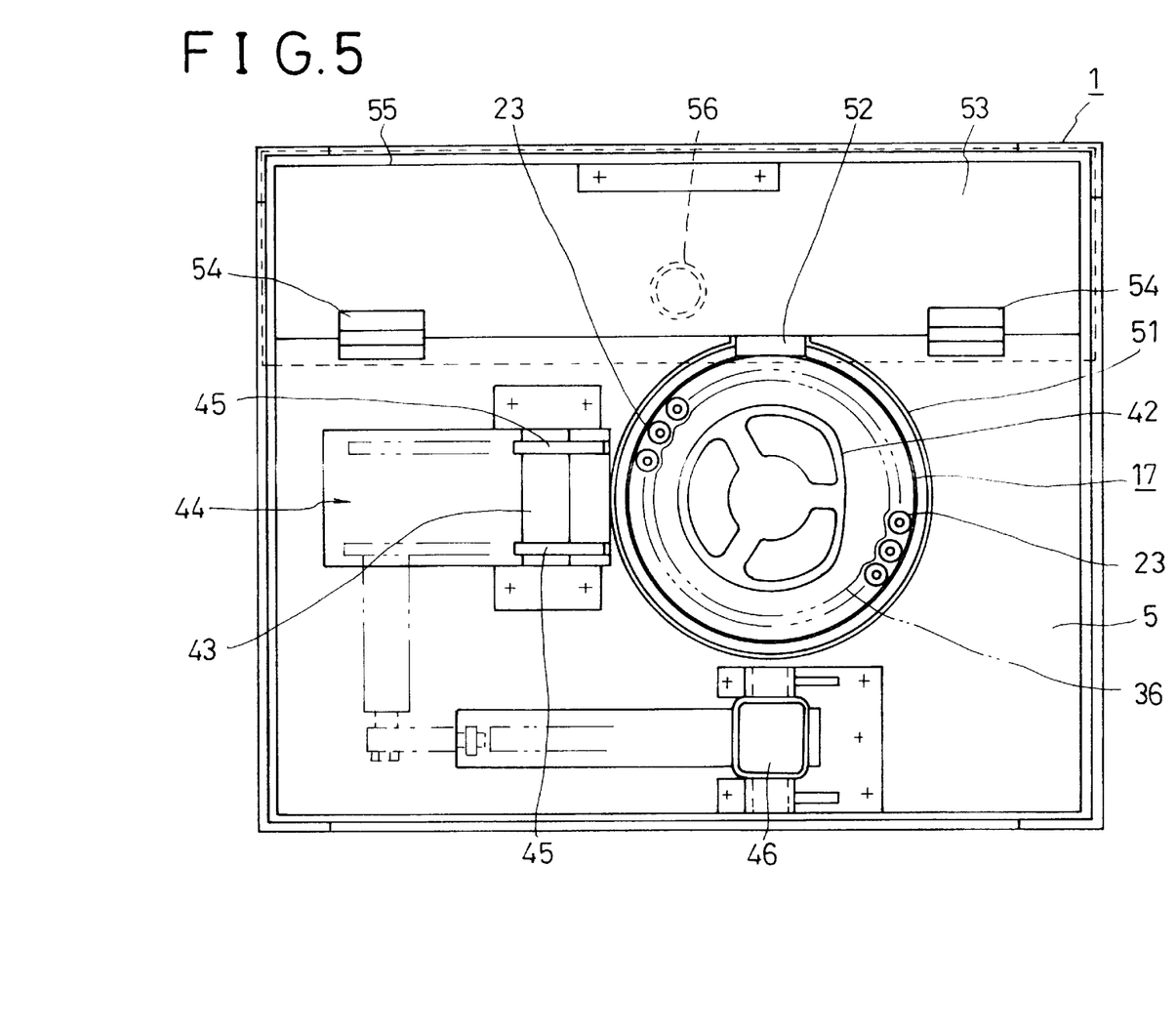
FIG. 5 is a schematic sectional view perpendicular to the axis showing the principal portion in the vicinity of the base plate.

As shown in FIGS. 1, 3, and 5, cylinder 51 having a diameter somewhat larger than the diameter of cylinder 17 and provided with water drainage window 52 is welded onto frame base plate 5 at a position around the bottom of cylinder 17. Water that flows down guided by each of round pipe members 23 inside cylinder 17 therefore flows through water drainage window 52, is collected inside tank 53, which is installed on the lower side of frame base plate 5 and has lid 55 that can be opened and closed by means of hinges 54, and is finally discharged to the outside by means of water drain hole 56 in tank 53.

Next, regarding the operation of this apparatus, when sludge that is delivered under pressure by a pump (not shown) is introduced into sludge holding hopper 13, sludge flows from outlet 14 in the bottom end of hopper 13 and through each of the shafts in the upper portion of rotating pipe shaft 24 and is introduced into cylindrical filter 36 from each of sludge outflow ports 28 in chute shaft 27. When a prescribed amount of sludge has been introduced into cylindrical filter 36, butterfly valve 16 closes and further delivery of sludge is halted. Sprocket wheel 34 is next rotated by means of the low-speed revolutions of drive motor 35, whereby sprocket wheel 32 is also rotated by means of chain 33, and as rotating pipe shaft 24, which is provided as a single piece with sprocket wheel 32, slowly rotates, rotating pipe shaft 24 descends together with the descent movable plate 8 that includes bearings 30 and 31, sprocket wheels 32 and 34, and drive motor 35 along support columns 6 under the action of air cylinder 11, which exerts force in a downward direction. Cylindrical filter 36, which is attached at its upper end to rotating pipe shaft 24 and at its lower end to frame base plate 5, is hereby given a twisting motion, by which sludge inside cylindrical filter 36 is pressed by each of round pipe members 23 inside cylinder 17. The water content of the sludge receiving this twisting action is efficiently extracted, whereby the sludge solidifies into a dewatered cake having a prescribed hardness. The extracted water flows down, guided by each round pipe member 23 without being dispersed inside cylinder 17, and collects in tank 53, from which the water drains out by way of water drain hole 56.

When drive motor 35 halts rotation and the extraction of the water content ends, drive motor 35 then rotates in reverse direction, rotating pipe shaft 24 rises together with movable plate 8 under the action of air cylinder 11 and returns to its original position, and cylindrical filter 36 returns to its initial upright state. When movable side 19 of cylinder 17 and cover plate 39 are opened in succession, dewatered cake easily separates from cylindrical filter 36 because the outer diameter of cylindrical filter 36 is somewhat greater than the diameter of a circle inscribed within round pipe members 23, and when pad 42 rotates on support shaft 43 and swings downward, pad 42 swings out from inside cylinder 17, and dewatered cake that is piled on dewatered cake pad 42 thereby falls and is ejected out together with this rotation. If necessary, rotating pipe shaft 24 may be brought down by the action of air cylinder 11 in a downward direction, whereby claw members 50 on the lower end of rotating pipe shaft 24 strike against dewatered cake and rotate outward approximately 90° on their support shafts to spread out horizontally, whereby dewatered cake is crushed, dislodged, and completely discharged.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A sludge dewatering treatment apparatus, comprising:
   a sludge holding hopper that is installed on a fixed plate on support columns provided vertically on the top plate of a frame, said frame further including a fixed lower plate having an opening therein;
   a cylinder that is open at top and bottom, that is vertically installed on said frame, and that is secured at an opening in the top plate of said frame;
   a rotating pipe shaft that has an upper end opening into which an outlet of said sludge holding hopper is inserted with clearance so as to realize continuous passage, that is arranged vertically and concentrically inside said cylinder, and further, that has sludge outflow ports;
   a cylindrical filter that surrounds the rotating pipe shaft, that is attached at its upper portion to the rotating pipe shaft above the sludge outflow ports, and that is secured at its lower portion to the rim of said opening in the base plate of the frame;
   a rotating pipe shaft rotation mechanism that is installed on a movable plate that is movable up and down along the support columns, and that serves to rotate said rotating pipe shaft and convey a twisting motion to said cylindrical filter;
   an opening and closing cover construction that opens the base plate opening of said frame to allow discharge to the outside of dewatered cake material inside said cylindrical filter;
   a water drainage construction that is installed on said frame and that drains water that is inside said cylinder that has been extracted by said cylindrical filter;
   wherein:
   said cylinder is a cylindrical construction that is divided in the axial direction into two parts, a fixed side and a movable side, to form a coupled cylindrical construction that can be opened and closed;
   round pipe members are secured in a row in an axial direction around the inner surface of said cylinder that contact and press said cylindrical filter during said twisting motion of said cylindrical filter to improve extraction of water, and that moreover guide extracted water so as to improve drainage;
   whereby:
   a twisting motion is applied to sludge that has been introduced into said cylindrical filter from said sludge holding hopper by way of said sludge outflow ports of said rotating pipe shaft;
   water is extracted to said cylinder and drained to the outside; and
   dewatered cake material inside said cylindrical filter is ejected to the outside by way of said opening and closing cover construction.

2. A sludge dewatering treatment apparatus according to claim 1 wherein a dewatered cake pad is installed upright on an opening and closing cover in said opening and closing cover construction to facilitate the fall of dewatered cake from inside said cylindrical filter to the outside when said opening and closing cover is opened.

3. A sludge dewatering treatment apparatus according to claim 1 or claim 2 wherein claw members are supported vertically and rotatably at the lower end of said rotating pipe shaft, whereby said claw members assume a substantially vertical state when said rotating pipe shaft rises but rotate outward to assume a substantially horizontal state when said rotating pipe shaft descends, thereby readily causing dewatered cake to fall.

* * * * *